US012637323B2

(12) United States Patent
Han et al.

(10) Patent No.: US 12,637,323 B2

(45) Date of Patent: May 26, 2026

(54) POSITION DETECTING DEVICE AND ELEVATOR SYSTEM INCLUDING THE SAME

(71) Applicant: Otis Elevator Company, Farmington, CT (US)

(72) Inventors: DaYong Han, Shanghai (CN); ManMan Liu, Shanghai (CN); Wei Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1248 days.

(21) Appl. No.: 17/510,682

(22) Filed: Oct. 26, 2021

(65) Prior Publication Data

US 2022/0219941 A1 Jul. 14, 2022

(30) Foreign Application Priority Data

Jan. 11, 2021 (CN) ........................ 202110030055.7

(51) Int. Cl.
*B66B 1/34* (2006.01)

(52) U.S. Cl.
CPC .................................. *B66B 1/3492* (2013.01)

(58) Field of Classification Search
CPC .................................................. B66B 1/3492
USPC ........................................................ 187/394
See application file for complete search history.

(56) References Cited

U.S. PATENT DOCUMENTS

| | | | | |
|---|---|---|---|---|
| 4,750,592 | A * | 6/1988 | Watt | B66B 1/3492 187/394 |
| 5,224,570 | A * | 7/1993 | Fromberg | B66B 5/22 187/376 |
| 6,401,872 | B1 * | 6/2002 | Morishita | B66B 7/044 187/292 |
| 9,352,934 | B1 * | 5/2016 | Lee | B66B 1/3492 |
| 2001/0025746 | A1 * | 10/2001 | Bammert | B66B 1/3492 187/394 |
| 2002/0043433 | A1 * | 4/2002 | Tanino | B66B 1/3492 187/394 |
| 2003/0085078 | A1 * | 5/2003 | Simmonds | B66B 5/22 187/373 |
| 2004/0216962 | A1 * | 11/2004 | Kunz | B66B 1/3492 187/394 |
| 2007/0227831 | A1 * | 10/2007 | Zaharia | B66B 1/3492 187/394 |

(Continued)

FOREIGN PATENT DOCUMENTS

| | | | | |
|---|---|---|---|---|
| CN | 1894152 | A * | 1/2007 | B66B 5/044 |
| CN | 201538626 | U * | 8/2010 | |

(Continued)

*Primary Examiner* — Christina M Schreiber

(74) *Attorney, Agent, or Firm* — CANTOR COLBURN LLP

(57) ABSTRACT

A position detecting device and an elevator system including the same. The position detecting device includes a ruler guide formed with a through groove for receiving and guiding a position ruler of the elevator system, the through groove further has a through opening toward a side surface of the ruler guide; and a limitator is provided at the through opening, the limitator is distributed or extended along a longitudinal direction of the through opening, and the position of the limitator is arranged to correspond to a site of the position ruler without position information.

11 Claims, 6 Drawing Sheets

(56) References Cited

U.S. PATENT DOCUMENTS

| | | | | |
|---|---|---|---|---|
| 2009/0120729 | A1* | 5/2009 | Okamoto | B66B 1/3492 187/394 |
| 2013/0284544 | A1* | 10/2013 | De Coi | B66B 1/3492 187/394 |
| 2018/0282120 | A1* | 10/2018 | Fauconnet | B66B 5/0093 |
| 2019/0023532 | A1* | 1/2019 | Zhang | B66B 5/22 |
| 2019/0367323 | A1* | 12/2019 | Birrer | B66B 7/027 |
| 2022/0106157 | A1* | 4/2022 | Sirigu | B66B 1/3492 |
| 2022/0119226 | A1* | 4/2022 | Bae | F16D 63/008 |
| 2022/0219941 | A1* | 7/2022 | Han | B66B 1/3492 |

FOREIGN PATENT DOCUMENTS

| | | | | | |
|---|---|---|---|---|---|
| CN | 106458507 | A | * | 2/2017 | B66B 1/36 |
| CN | 207566657 | U | * | 7/2018 | |
| CN | 210093371 | U | * | 2/2020 | |
| JP | 3628356 | B2 | * | 3/2005 | B66B 1/40 |
| JP | 2020138853 | A | * | 9/2020 | B66B 13/26 |

* cited by examiner

POSITION DETECTING DEVICE AND ELEVATOR SYSTEM INCLUDING THE SAME

FOREIGN PRIORITY

This application claims priority to Chinese Patent Application No. 202110030055.7, filed Jan. 11, 2021, and all the benefits accruing therefrom under 35 U.S.C. § 119, the contents of which in its entirety are herein incorporated by reference.

TECHNICAL FIELD

The present invention relates to the technical field of elevators; specifically, the present invention relates to a position detecting device and an elevator system including the same.

BACKGROUND

With the development of society, there are more and more multistorey and even highrise buildings regardless of whether in living areas or in commercial areas, production areas and so on. Elevators are usually installed in these buildings to transport people or goods between floors.

In order to improve the transportation efficiency of elevators and ensure transportation safety and stability, it is necessary to perform real-time detection of the position of the elevator car.

The car position detecting technology in the prior art includes setting a position ruler vertically suspended from the top of the hoistway in the elevator hoistway and installing a sensor on the elevator car, and detecting the position of the car by collecting position information on the position ruler via the sensor.

SUMMARY

An object of one aspect of the present invention is to provide an improved position detecting device.

An object of another aspect of the present invention is to provide an elevator system including the position detecting device of the foregoing aspect.

In order to achieve the foregoing objects, one aspect of the present invention provides a position detecting device for an elevator system, the position detecting device comprises: a ruler guide formed with a through groove for receiving and guiding a position ruler of the elevator system, the through groove further has a through opening toward a side surface of the ruler guide; and wherein, a limitator is provided at the through opening, the limitator is distributed or extended along a longitudinal direction of the through opening, and the position of the limitator is arranged to correspond to a site of the position ruler without position information.

Optionally, in the position detecting device as described above, the limitator is an independent component.

Optionally, in the position detecting device as described above, the limitator is a flanging that narrows the through opening from both sides of the through groove.

Optionally, in the position detecting device as described above, the position detecting device further includes a lining board, which covers the through opening in a removable manner at the side surface of the ruler guide, and the limitator is integrally formed on the lining board.

Optionally, in the position detecting device as described above, the position detecting device has an outer housing, the outer housing has a groove opening at least toward both ends thereof, the ruler guide is received in the groove, and, the width of the groove is greater than the width of the ruler guide, a protrusion or a recess is provided at two outer side walls of the ruler guide adjoining the through opening, and the corresponding recess or protrusion is provided at the corresponding inner side walls of the groove, the protrusion is received and guided in the recess.

Optionally, in the position detecting device as described above, the groove of the outer housing further has a side through opening, the width of the side through opening is smaller than the width of the ruler guide, and the ruler guide is arranged in the groove such that the through opening of the through groove faces towards the bottom surface of the groove.

Optionally, in the position detecting device as described above, a biasing element is provided between the protrusion and the recess, the biasing element biases both the protrusion and the recess at the same time in opposite directions.

Optionally, in the position detecting device as described above, more than one protrusion or recess is provided on each side of the ruler guide, and the protrusion or recess is distributed along the longitudinal direction of the ruler guide.

Optionally, in the position detecting device as described above, the position detecting device further includes a sensor located outside the ruler guide, the sensor faces the through opening and is adapted to read the position information of the position ruler of the elevator system through the through opening, in order to achieve the foregoing objects, another aspect of the present invention provides an elevator system, a position detecting system of the elevator system comprises: the position detecting device according to any one of the preceding aspects, which is attached to a side surface of a car or counterweight of the elevator system; and a position ruler vertically placed in the hoistway of the elevator system, the position ruler extends through the through groove of the ruler guide.

DESCRIPTION OF THE DRAWINGS

With reference to the drawings, the disclosure of the present invention will be more apparent. It should be understood that these drawings are only for illustrative purposes and are not intended to limit the scope of protection of the present invention. In the drawings.

DETAILED DESCRIPTION

Figure 1:
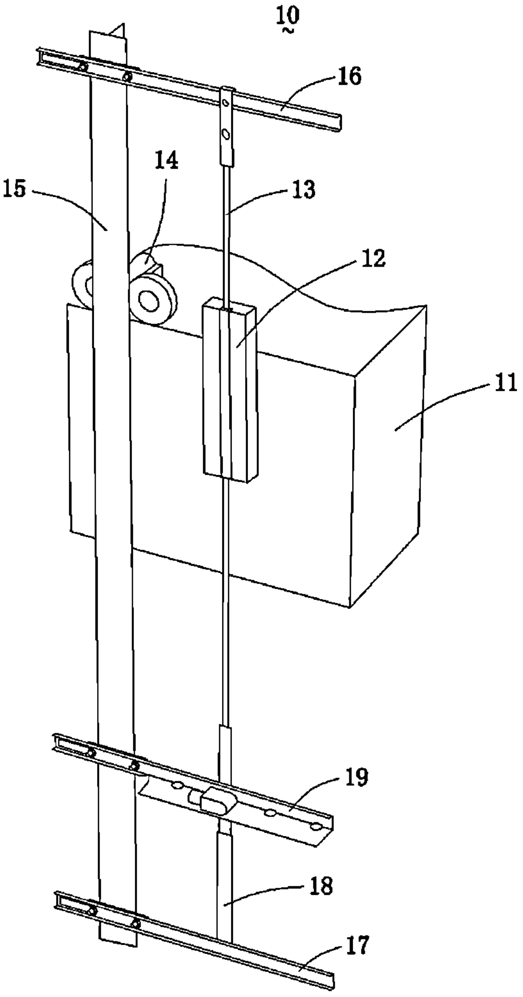
FIG. 1 is a schematic diagram of an elevator system, in which a position detecting device according to an embodiment of the present invention is shown.

Hereinafter, specific embodiments of the present invention will be described in detail with reference to the accompanying drawings. In the drawings, the same reference numerals indicate the same or corresponding technical features. In addition, for the sake of brevity, for more than one technical feature, only one place or several places may be marked in the same drawing.

It can be understood that although the detailed description has been made in combination with a limited number of embodiments in the specifications, those skilled in the art can expand, modify, replace, and/or combine technical features on this basis. Therefore, the content in the specification is descriptive and should not be regarded as limiting the scope of the present invention.

FIG. 1 is a schematic diagram of an elevator system, in which a position detecting device according to an embodiment of the present invention is shown.

Specifically, FIG. 1 shows an elevator system 10, and specifically shows a car 11 of the elevator system 10 and a guide system and a position detecting system for the car 11.

According to the illustration, the guide system for the car 11 includes a guide wheel assembly 14 and a guide rail 15. The upper and lower ends of the guide rail 15 are respectively fixed to a top bracket 16 and a bottom bracket 17 in the hoistway of the elevator system. When the elevator system is running, the car 11 can go up and down along the guide system under the driving force of the traction system (not shown) to transport people or goods between floors of different heights.

Regarding the specific lifting principle and structure of the elevator system, no further description will be given here. It should be understood that the various embodiments of the present invention can be adapted to various different types of elevator systems, and are not limited to the elevator systems exemplified in the drawings.

The drawings also show a position detecting system for the car 11 in the elevator system 10. It can be seen from the drawings that the position detecting system includes a position detecting device 12 and a position ruler 13. The position ruler 13 is arranged through the position detecting device 12 and can move up and down along the position ruler 13, so that a sensor 40 (see FIG. 7*a*) in the position detecting device 12 can scan the position information on the position ruler 13.

In this embodiment, the position detecting device 12 is fixed on the back side of the car 11 of the elevator system 10. According to specific situations, in other embodiments, the position detecting device 12 may also be attached on other side surfaces of the car. When the car 11 moves up and down, the position detecting device 12 will move up and down together with the car 11. In other embodiments, the position detecting device 12 may also be provided in other appropriate positions of the car 11 adapted to its sensor to scan the position information on the position ruler 13.

In this embodiment, the position ruler 13 is in the shape of a strip, which is vertically placed in the hoistway of the elevator system 10. Specifically, the upper end of the position ruler 13 is fixed to the top bracket 16 in the hoistway of the elevator system, and the lower end is suspended to the bottom bracket 17 in the hoistway of the elevator system through a tensioner 18. In order to limit the swing amplitude of the position ruler 13, a guide bracket 19 is optionally provided in this embodiment, and the lower end of the position ruler 13 passes through a through hole on the guide bracket 19 to prevent the lower end of the position ruler 13 from swinging excessively. It can be understood that in different embodiments, the upper and lower ends of the position ruler 13 can also be fixed to the top and bottom of the hoistway of the elevator system, respectively.

In a specific example, the sensor in the position detecting device 12 may be a magnetic sensor, the position information on the position ruler 13 may be, for example, the magnetic position information of a magnetic code. During the running of the elevator system, through the up and down movement of the elevator car, the magnetic sensor reads the position information at different heights of the position ruler 13 and provides it to the relevant analysis unit, control unit, etc. of the elevator system, which can be used in the detection of the position, speed, acceleration, etc. of the elevator car and the related control of the elevator system, such as but not limited to elevator leveling function and/or safety protection function, etc.

In another embodiment, the position detecting device may be fixed to the side surface of the counterweight (not shown) in the elevator system. In this case, the position ruler is also appropriately installed near the counterweight in the hoistway. When the counterweight goes up and down with the car, the position information of the position ruler is scanned by the sensor in the position detecting device to obtain the moving position of the counterweight; based on the moving position of the counterweight, according to the relation between the position of the counterweight and the position of the car, the calculation unit, analysis unit and/or control unit of the elevator system can further obtain the position, speed, acceleration and other information of the elevator car and perform related control of the elevator system.

Here, the position detecting device is "fixed" to the car or the counterweight, including that the position detecting device is directly or indirectly fixed to the car or the counterweight. In one embodiment, the position detecting device may be fixed to the car or the counterweight by a mounting bracket.

Figure 2:
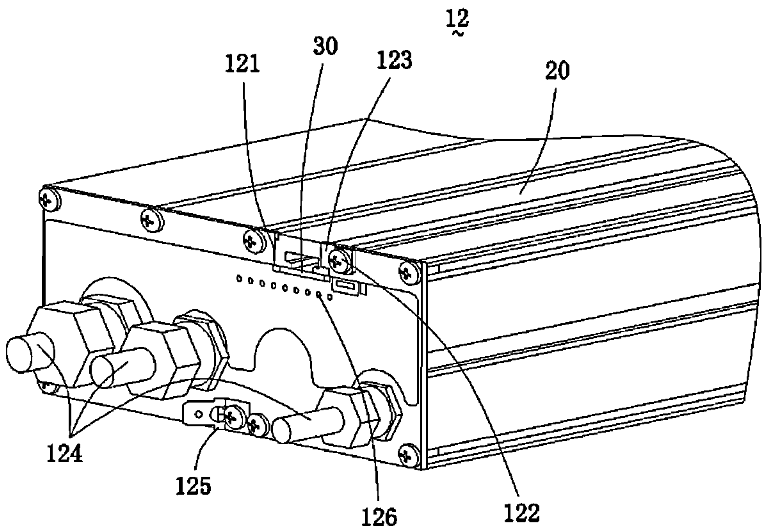
FIG. 2 is a partial three-dimensional schematic diagram of the position detecting device of the elevator system in FIG. 1.

FIG. 2 is a partial three-dimensional schematic diagram of the position detecting device of the elevator system in FIG. 1.

As can be seen from the drawings, in this embodiment, the position detecting device is exemplarily in the shape of a cuboid. The position detecting device has an outer housing, and a groove 121 opening toward both ends of the outer housing is formed on one side surface (for example, the back side) of the outer housing, a ruler guide 20 is provided in the groove 121.

The grooves 121 are open towards both ends of the outer housing and at the same time open towards the side surface of the outer housing. The side surface opening provides convenience for installing a position ruler to the position detecting device, which will be further described below. The width of the side surface opening is smaller than the width of the ruler guide 20, so the ruler guide 20 will not fall off from the groove 121. It can be seen that, in order to receive the ruler guide 20, the inner width of the groove 121 is also greater than the width of the side surface opening.

The openings at both ends of the groove 121 may be smaller than the cross-sectional size of the ruler guide 20 to prevent the ruler guide 20 from falling off the groove 121 in the axial direction. Alternatively, at the end as shown in the drawings, a stopper 123 is provided, and the stopper 123 is installed at the end of the groove 121 by a screw 122, in the position shown in the drawings, the stopper 123 restricts the size of the groove 121 at the opening of the end, preventing the ruler guide 20 from falling off from the opening of the end of the groove 121. After the screw 122 is loosened, the stopper 123 can be rotated outward or inward, for example, 90 degrees, so as to completely release the opening of the groove 121 at this end, so that the ruler guide 20 can be drawn out of the groove 121. In an optional embodiment, a stopper may be provided on one or both ends of the groove 121 in this way, or a stopper may be provided on one or both sides of the groove 121 in this way.

In the illustrated embodiment, the width of the groove 121 is optionally equal to the width of the ruler guide 20, so the ruler guide 20 can be stably installed in the groove 121. In an optional embodiment, the width of the groove 121 may also be greater than the width of the ruler guide 20; in this case, a restoring element, that is, a biasing element, may be provided on both sides of the ruler guide 20 to prevent it from colliding with grooves. At the same time, the restoring element can also play a role in eliminating the vibration transmitted from the car 11 to the ruler guide 20, which is beneficial to prevent scratches between the position ruler 13 and the through groove 21 in the ruler guide 12.

An optional lining board 30 is also shown in the drawings Here, the lining board 30 is an optional component, which helps to isolate the groove from the inside of the position detecting device 12, and can prevent dust and so on from entering the inside of the position detecting device 12, for example. For example, in the case where the sensor detects the position information on the position ruler through optical principles, the lining board may be made of transparent material. The lining board 30 and the through groove 21 of the ruler guide 20 (see FIG. 4) constitute the space for the position ruler 13 to pass through and to move back and forth along it.

In addition, as can be seen from the drawings, other functional features such as a cable joint 124, a ground wire insert 125, an indicator light 126, and the like may also be provided on the position detecting device 12. It will not be repeated here.

FIGS. 3-6 show schematic steps of assembling the position ruler 13 to the position detecting device 12.

Figure 3:
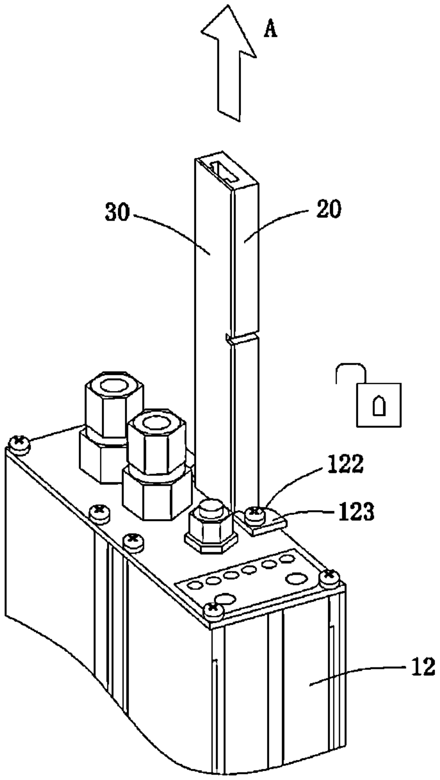
FIGS. 3-6 show schematic steps of assembling the position ruler to the position detecting device.

In FIG. 3, the position ruler has not been assembled into the position detecting device 12. Here is the initial preparation step for assembling the position ruler. In this preparation step, first, the stopper 123 can be rotated by loosening the screw 122. For example, the stopper 123 can be rotated in a clockwise or counterclockwise direction until the stopper 123 leaves the opening of the end of the groove and reaches an unlocked position that no longer blocks at the opening of the end of the groove, so that the ruler guide 20 and the lining board 30 can be drawn out of the groove of the position detecting device 12. In the drawings, the stopper 123 is schematically rotated 90 degrees clockwise. Then, the ruler guide 20 and the lining board 30 are drawn out of the groove of the position detecting device 12 in the direction indicated by arrow A. In this example, the way shown by arrow A is the upward direction of the elevator.

It can be understood that, as an optional manner, only the ruler guide 20 may be drawn out of the groove.

Figure 4:
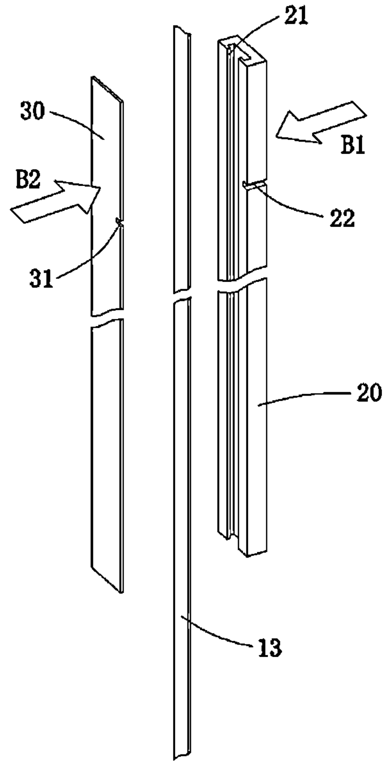

According to FIG. 4, the ruler guide 20 is separated from the lining board 30 at first, and then the position ruler 13 is placed between the ruler guide 20 and the lining board 30 as shown, specifically, the position ruler 13 is placed in the through groove 21 of the ruler guide 20. Finally, the lining board 30 and the ruler guide 20 are closed again, and the lining board 30 is used to cover the side surface opening of the through groove 21 of the ruler guide 20. The directions indicated by arrows B1 and B2 in FIG. 4 are the schematic directions for assembling the ruler guide 20 and the lining board 30 together respectively. In this way, the position ruler 13 is surrounded in the space enclosed by the lining board 30 and the through groove 21 of the ruler guide 20. The position ruler 13 can move back and forth along the longitudinal direction in the through groove 21 of the ruler guide 20.

As can be seen from FIG. 4, the ruler guide 20 is formed with a through groove 21 for receiving and guiding the position ruler 13 of the elevator system, the through groove 21 further has a through opening toward the side surface of the ruler guide. The side surface opening of the aforementioned through groove 21 is the through opening.

Figure 5:
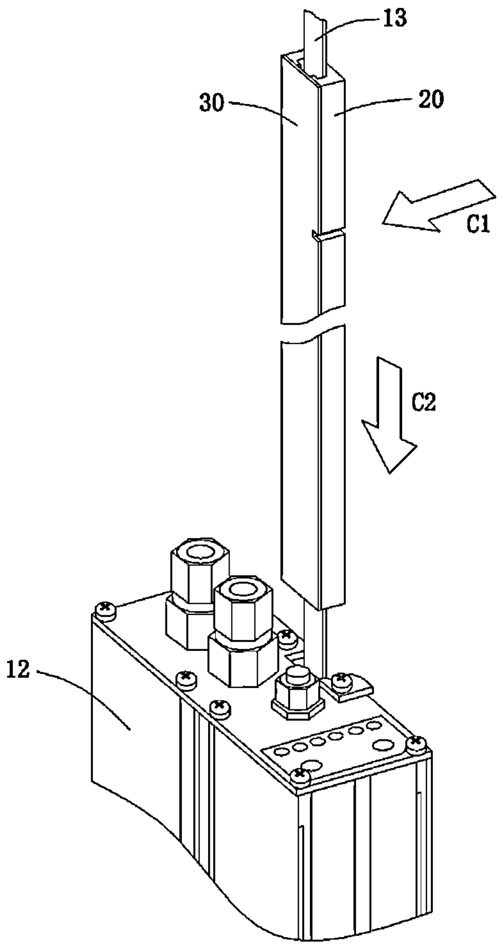

In FIG. 5, the position ruler 13 has been arranged in the ruler guide 20, specifically surrounded in the space between the ruler guide 20 and the lining board 30. Then, the ruler guide 20, the lining board 30 and the position ruler 13 are moved to the position detecting device 12 together in the direction indicated by arrow C1 in the drawings at first. Since the side surface of the groove of the position detecting device 12 is provided with an opening, the position ruler 13 can enter into the groove. Since the position ruler 13 can move up and down freely relative to the ruler guide 20 and the lining board 30 in this space, at this time, the ruler guide 20 and the lining board 30 can be moved up and down freely in the case where the vertical position of the position ruler 13 remains unchanged. As shown in the drawings, the ruler guide 20 and the lining board 30 can be inserted into the groove of the position detecting device 12 in the direction indicated by arrow C2.

Here, the through opening of the through groove of the ruler guide 20 faces towards the bottom surface of the groove on the outer housing of the position detecting device.

Figure 6:
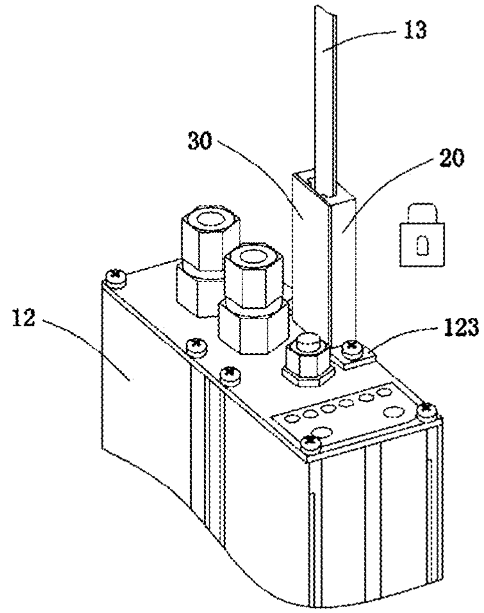

In FIG. 6, the ruler guide 20 and the lining board 30 have been inserted into the groove of the position detecting device 12. The stopper 123 has been restored to the locked position, restricting the longitudinal movement of the ruler guide 20 and the lining board 30 relative to the position detecting device 12.

It can be seen from FIG. 6 that, at the locked position, a part of the upper end of the ruler guide 20 and the lining board 30 protrudes out of the groove of the position detecting device 12. This is because, as shown in FIGS. 3-5, corresponding lock notches 22 and 31 are respectively provided on the ruler guide 20 and the lining board 30, and when both are inserted into the groove of the position detecting device 12 and the lock notches 22 and 31 are aligned with the stopper 123, the stopper 123 can rotate into the lock notches 22 and 31, thereby locking the ruler guide 20 and the lining board 30 in place.

In an optional embodiment, such lock notches 22 and 31 may also not be provided. In this case, the length of the ruler guide 20 and the lining board 30 is not greater than the length of the groove of the position detecting device 12 so that they can be fully inserted into the groove, and then the stopper 123 can prevents them from falling out of the groove at the opening of the end of the groove.

In combination with the above description, it can be understood that in the illustrations of FIGS. 3-6, the position ruler 13 can be assembled into the position detecting device without drawing the lining board 30 out of the groove. Specifically, during operation, only the ruler guide 20 is drawn out of the groove, and then the position ruler 13 is placed in the through groove of the ruler guide 20, and finally the ruler guide 20 and the position ruler 13 are moved to the position detecting device 12 and the ruler guide 20 fits with the lining board 30 and is inserted into the groove, until it reaches a position adapted to lock and is locked in place by the stopper 123.

According to the above-mentioned embodiment, a case where the groove of the position detecting device has a through opening on the side surface (that is, a side through opening) is described. In an optional embodiment, if a groove that does not have a through opening on the side surface is provided in the position detecting device, the position ruler can be inserted into the through groove of the ruler guide 20 located in the groove at the lower end of the position ruler.

Figures 7A, 7B:
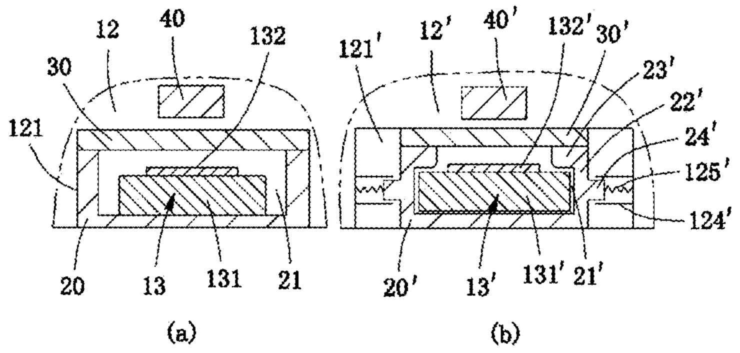
FIGS. 7*a* and 7*b* shows a cross-sectional schematic diagram at the groove of the position detecting device.

FIG. 7*a* shows a cross-sectional schematic diagram at the groove of the position detecting device, wherein FIG. 7*b* is an improved solution. The position detecting device and the position ruler constitute a position detecting system for the elevator system.

As can be seen in FIG. 7*a*, the ruler guide 20 and the lining board 30 are inserted into the groove 121 of the position detecting device 12. In this example, the size of the ruler guide 20 and the lining board 30 fits exactly with the side surface of the inner wall of the groove 121, it is beneficial to prevent their relative movement from causing detection errors or scratching damage between components. The lining board 30 covers the side surface opening of the through groove 21 of the ruler guide 20 (the side surface opening here refers to the side facing the lining board and the sensor 40). In the space enclosed by the ruler guide 20 and the lining board 30, the position ruler 13 passes therethrough. The position ruler 13 includes a strip 131 constituting its base and position information 132. A sensor 40 is provided in the position detecting device 12. The sensor 40 is provided outside the ruler guide 20, which can read the information data on the position ruler 13 in the elevator hoistway without any contact. In the case where the sensor 40 is a magnetic sensor, the position information 132 on the position ruler 13 may be magnetic position information, such as a magnetic code and so on. In an optional embodiment, it can be implemented by different types of sensors and position information. In this solution, there is a risk that the position information 132 on the position ruler 13 is scratched by the lining board 30.

In FIG. 7*b*, the ruler guide 20' and the lining board 30' are inserted in the groove 121' of the position detecting device 12'. In this solution, the width of the groove 121' is greater than the width of both the ruler guide 20' and the lining board 30', and there is the space formed between the side surfaces of the ruler guide 20' and the lining board 30' and the inner wall of the groove 121'. The lining board 30' covers the side surface opening of the through groove 21' of the ruler guide 20' (the side surface opening here refers to being at the side facing the lining board and the sensor). In the space enclosed by the ruler guide 20' and the lining board 30', the position ruler 13' passes therethrough. The position ruler 13' includes a strip 131' constituting its base and position information 132'. A sensor 40' is provided in the position detecting device 12'. The sensor 40' is provided outside of the ruler guide 20', the sensor 40' can face the through opening of the ruler guide 20' and is adapted to read the position information 132' of the position ruler 13' of the elevator system through the through opening. In the case where the sensor 40' is a magnetic sensor, the position information 132' on the position ruler 13' may be magnetic position information, such as a magnetic code and so on. In an optional embodiment, it can be implemented by different types of sensors and position information.

It can also be seen from the drawings that, the ruler guide 20' here has a flanging 23' that narrows the opening from both sides of the through groove 21'. In the drawings, the position information 132' is located at the center position of the strip 131'; correspondingly, the flanging 23' is located at both sides of the opening of the through groove 21', so that the flanging 23' will not scratch the position information 132' on the strip 131'. In this way, when the position detecting device 12' moves back and forth relative to the position ruler 13', the position of the position ruler 13' is limited by the flanging 23', so that the position information 132' on the position ruler 13' will not touch or scratch the lining board 30'. The flanging 23' may extend through in the longitudinal direction of the through groove 21', or it may be several flangings distributed along the longitudinal direction of the through groove 21' that are disconnected from each other.

The flanging 23' shown in the drawings is an example of a limitator. In an optional embodiment, an independent limitator may be provided at the opening of the through groove 21'. The independent limitator may be a component independent of the ruler guide 20' and the lining board 30', and it may be fixed at the side surface opening of the through groove of the ruler guide 20' in a suitable manner. The independent limitator can be distributed or extended along the longitudinal direction of the through groove opening, and its position can be arranged to correspond to the site of the position ruler 13' that does not have the position information 132'.

In another embodiment, the limitator may be formed on the lining board. Similarly, it can be distributed or extended along the longitudinal direction of the through groove opening, and its position can be arranged to correspond to the site of the position ruler 13' that does not have the position information 132'.

By providing the aforementioned various types of limitators at the openings of the through grooves, it is possible to prevent or weaken the influence to the position ruler caused due to vibration when the car goes up and down, even if the position ruler moves towards the ruler guide and the lining board travelling up and down, it is also blocked by the limitator and will not scratch the position information on the position ruler, which will not affect the use of the position detecting system and ensure that it can be used for a long time.

In addition, in FIG. 7*b*, the groove 121 of the position detecting device 12 in the (a) solution is appropriately widened. It can be seen from the drawings, that the ruler guide 13' is received in the groove 121', and the width of the groove 121' is greater than the width of the ruler guide 20'. In the illustrated example, a protrusion 24' is provided at two outer side walls 22' of the ruler guide 20' adjoining the through opening, and the corresponding recess 124' is provided at the corresponding inner side walls of the groove 121', the protrusion 24' is received and guided in the recess 124'. In an optional embodiment, a recess is also provided at two outer side walls of the ruler guide adjoining the through opening, and the corresponding protrusion is provided at the corresponding inner side walls of the groove, the protrusion is received and guided in the recess. The interaction of the protrusion and recess provided in this way can further prevent the position ruler from moving to the ruler guide 20' and the lining board 30'. Similarly, it helps prevent or weaken the influence to the position ruler caused due to vibration when the car goes up and down.

According to specific situations, more than one (for example, three) protrusions or recesses may be provided on each side of the ruler guide 20', and the protrusions or recesses may be distributed along the longitudinal direction of the groove and the ruler guide of the position detecting device. In some embodiments, as shown in the drawings, the recess may be provided by a hollow tube attached to the corresponding wall surface, and the protrusion may extend into the hollow tube. When installing the ruler guide, the protrusion of one side can be extend into the corresponding recess at first, causing the ruler guide to tilt, and then the protrusion of another side can be extend into the corresponding recess.

As shown in FIG. 7*b*, a biasing element 125' is also provided between each pair of protrusion and recess, the biasing element 125' biases both the protrusion 24' and the recess 124' at the same time in opposite directions. In the illustrated embodiment, the biasing element 125' is a spring. Specifically, the spring may be a compression spring or a tension spring. At the initial position of the spring, the positions of the ruler guide and the lining board are centered with the position of the position ruler, and the position ruler will not touch the ruler guide and the lining board. Under the action of the biasing element, the ruler guide is always in the relative position that is centered relative to the groove of the position detecting device as far as possible. On the one hand, it prevents the ruler guide from falling out of the groove, and on the other hand, it also prevents the shaking or vibration of the position detecting device from directly transmitting to the ruler guide, and the biasing element acts as a buffer here. Sometimes, due to deviations in the installation of the elevator system's hoistway, or when the car vibrates, it can be ensured that there is no great friction on its both sides so that the position ruler is subject to wear.

Figures 8A, 8B:
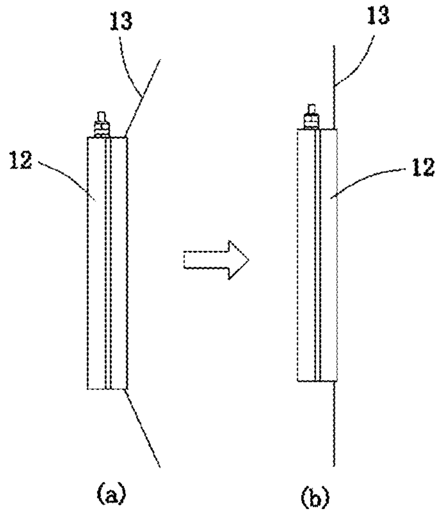
FIGS. 8*a* and 8*b* shows a schematic diagram of the assembled position detecting device and position ruler.

FIGS. 8*a* and 8*b* shows a schematic diagram of an assembled position detecting device and a position ruler. The postures of the position rulers in the hoistway in FIGS. 8*a* and 8*b* correspond to the solutions in FIGS. 7*a* and 7*b*, respectively. In FIG. 7*a*, there is no limitator at the side surface opening of the ruler guide 20, so there is a risk that the position ruler 13 touches the lining board and the like and damages the position information on the position ruler 13. In order to avoid this situation, as shown in FIG. 8*a*, the position ruler 13 is pulled obliquely in the hoistway so that the position ruler 13 is away from the lining board 30 in the position detecting device. This puts the higher requirements on the size and layout of the elevator system's hoistway (especially when the hoistway of the elevator system is higher in a highrise building), because the position ruler 13 needs to be pulled far, which cannot be achieved if the hoistway space is small. In contrast, in FIG. 7*b*, due to the presence of the limitator 23' and the like, the position information 132' of the position ruler 13' has been effectively prevented from touching the lining board 30' and other components, thereby the position ruler 13' does not need to be obliquely provided in the hoistway, and the position ruler vertically placed in the hoistway of the elevator system reduces the requirements on the size and layout of the hoistway of the elevator system.

As described above, the position detecting device according to several embodiments of the present invention and the elevator system including the position detecting device according to several embodiments are described. It should be understood that the claimed scope of the present invention is not only limited to the content in the above description, those skilled in the art can make various transformations, modifications and/or combinations of the above embodiments without departing from the technical idea of the present invention. These transformations, modifications and/or combinations should all fall within the scope of the present invention.

What is claimed is:

1. A position detecting device for an elevator system, characterized in that, the position detecting device comprises:

a ruler guide formed with a through groove for receiving and guiding a position ruler of the elevator system, the through groove further has a through opening toward a side surface of the ruler guide; and a limitator positioned at the through opening, the limitator is distributed or extended along a longitudinal direction of the through opening, and the limitator is positioned outside of a position information on the position ruler, the limitator configured to limit travel of the position ruler;

wherein the limitator includes a flanging that narrows the through opening from both sides of the through groove;

a sensor located outside the ruler guide, the sensor facing the through opening and configured to read the position information on the position ruler of the elevator system through the through opening.

2. The position detecting device according to claim 1, wherein the limitator is an independent component.

3. The position detecting device according to claim 1, wherein the position detecting device further includes a lining board, which covers the through opening in a removable manner at the side surface of the ruler guide, and the limitator is integrally formed on the lining board.

4. The position detecting device according to claim 1, wherein the position detecting device has an outer housing, the outer housing has a groove, the ruler guide is received in the groove, wherein a width of the groove is greater than a width of the ruler guide, and a protrusion is provided at two an outer side wall of the ruler guide and a recess is provided at an inner side wall of the groove, the protrusion is received and guided in the recess.

5. The position detecting device according to claim 4, wherein the groove of the outer housing further has a side through opening, a width of the side through opening is smaller than the width of the ruler guide.

6. The position detecting device according to claim 4, wherein a biasing element is provided between the protrusion and the recess, the biasing element biases both of the protrusion and the recess in opposite directions.

7. The position detecting device according to claim 4, further comprising a second protrusion provided at the outer side wall of the ruler guide, protrusion and the second protrusion distributed along the longitudinal direction of the ruler guide.

8. An elevator system, characterized in that, a position detecting system of the elevator system comprises:

the position detecting device according to claim 1, which is attached to a side surface of a car or counterweight of the elevator system; and the position ruler vertically placed in a hoistway of the elevator system, the position ruler extends through the through groove of the ruler guide.

9. The position detecting device according to claim 1, wherein the limitator is positioned between the position ruler and the sensor.

10. The position detecting device according to claim 1, wherein the position detecting device has an outer housing, the outer housing has a groove, the ruler guide is received in the groove, wherein a width of the groove is greater than a width of the ruler guide, and a recess is provided at an outer side wall of the ruler guide and a protrusion is provided at an inner side wall of the groove, the protrusion is received and guided in the recess.

11. The position detecting device according to claim 10, further comprising a second recess provided at the outer side wall of the ruler guide, the recess and the second recess distributed along the longitudinal direction of the ruler guide.

* * * * *